(12) United States Patent
Izuchi et al.

(10) Patent No.: US 7,171,012 B2
(45) Date of Patent: Jan. 30, 2007

(54) MICROPHONE

(75) Inventors: Toshiro Izuchi, Fukuoka (JP); Hiroshi Yamagata, Fukuoka (JP); Naosuke Fukada, Fukuoka (JP); Hideki Kozawa, Dusseldorf (DE)

(73) Assignee: Hosiden Corporation, Osaka (JP)

( * ) Notice: Subject to any disclaimer, the term of this patent is extended or adjusted under 35 U.S.C. 154(b) by 335 days.

(21) Appl. No.: 10/725,894

(22) Filed: Dec. 1, 2003

(65) Prior Publication Data

US 2004/0109579 A1 Jun. 10, 2004

(30) Foreign Application Priority Data

Dec. 3, 2002 (JP) .............................. 2002-350856
Nov. 26, 2003 (JP) .............................. 2003-395448

(51) Int. Cl.
*H04R 25/00* (2006.01)

(52) U.S. Cl. ..................... 381/174; 381/369; 381/191

(58) Field of Classification Search ........ 381/173–174, 381/190–191, 113, 116
See application file for complete search history.

(56) References Cited

U.S. PATENT DOCUMENTS

| 4,302,633 | A | * | 11/1981 | Tamamura et al. ......... 307/400 |
| 4,321,432 | A | * | 3/1982 | Matsutani et al. .......... 381/174 |
| 4,621,171 | A | * | 11/1986 | Wada et al. ................. 381/113 |
| 5,272,758 | A | * | 12/1993 | Isogami et al. ............. 381/191 |
| 2003/0068055 | A1 | * | 4/2003 | Tanabe et al. .............. 381/191 |
| 2005/0089180 | A1 | * | 4/2005 | Saeki et al. ................. 381/174 |

FOREIGN PATENT DOCUMENTS

| EP | 0 319 010 A2 | 6/1989 |
| EP | 0 531 613 A2 | 3/1993 |
| JP | S57-155890 | 9/1982 |
| JP | H05-0233698 | 3/1993 |
| JP | 2548543 | 5/1997 |
| JP | 11150795 | 6/1999 |
| JP | 1 427 250 A2 * | 9/2004 |

* cited by examiner

*Primary Examiner*—Suhan Ni
*Assistant Examiner*—Phylesha Dabney
(74) *Attorney, Agent, or Firm*—David N. Lathrop, Esq.; Gallagher & Lathrop

(57) ABSTRACT

Affixed in intimate contact to the inside surface of a front board 10a of a conductive capsule 10 provided with a receiving sound aperture 10aa is a conductive back electrode board provided with air vent apertures 11a, 11b which are positioned not in alignment with the receiving sound aperture, these apertures 10a and 11a, 11b being connected by a slit 10ad. A polarized FEP film 12 which is an electret film is disposed on the surface of the back electrode board 11 opposite from the front board 10a, and a conductive diaphragm 14 is disposed on the surface of the FEP 12 opposite from the back electrode board 11 with a spacer 13 interposed therebetween which extends around the outer periphery of the opposite surface of the FEP 12. These component parts are accommodate in the capsule 10 to constitute an electret condenser microphone which is capable of suppressing sensitivity degradation due to ingress of grit from the outside to the electret film.

12 Claims, 9 Drawing Sheets

MICROPHONE

BACKGROUND OF THE INVENTION

1. Field of the Invention

This invention relates to a condenser type microphone, and more particularly to a condenser microphone utilizing an electret (permanently electrification) phenomenon.

2. The Prior Art

Heretofore, the electret condenser microphone utilizing variations in capacitance of a condenser comprising an electrically conductive vibration diaphragm and an electrically conductive board having formed thereon an electret film (permanently electrified film) such as FEP (Fluoro Ethylene Propylene) to transform a sound pressure into an electrical signal has been known (see Japanese Utility Model Registration No. 2548543 and Japanese Patent Application Publication No. 11-150795). The electret condenser microphone falls roughly into two categories: the front electret type and the back electret type, based on the positional relationship between the diaphragm and the electret film. Generally, the front electret type is superior in terms of miniaturization whereas the back electret type is superior in terms of performance and cost. The general construction of these two types of electret condenser microphone will be described below.

FIG. 8 is a cross-sectional view illustrating the structure of a microphone 100 which is an example of the electret condenser microphone of the prior art front electret type.

As illustrated in FIG. 8, the microphone 100 includes a capsule 101 in the form of a cylindrical bottom-walled cup made of metal such as aluminum and having an integrally formed bottom wall that is called hereinafter as a front board 101a; an FEP 102 which is an electret film; an annular disc-like spacer 103 formed of an electric insulator such as PET (polyester) or the like; a diaphragm 104 comprising a film 104a such as PET and a metal layer such as nickel vapor-deposited on the film 104a; cylindrical rings 105 and 106 made of an electric conductor such as stainless steel or the like; a base 107 formed of glass epoxy or the like and having a directivity modulating sound aperture 107a formed therethrough and an impedance converting FET (field-effect transistor) 108 and a chip capacitor 109 mounted thereon.

The front board 101a is formed with a receiving sound aperture 101aa which is a through aperture, and an FEP film 102 which is an insulator and has been subjected to polarization treatment to become the electret film is deposited on the entire inner wall surface of the capsule 101 except for its upper folded end portion 101c. The FEP 102, spacer 103, diaphragm 104, ring 105, ring 106 and base 107 are stacked successively in the order named on the FEP film 102 on the inner wall side of the front board 101a. The upper end (or the rear end if the front board is considered as the front end as it faces a sound source) of the capsule 101 is folded inwardly to force an end face of the base 107 towards the front board 101a, which in turn forces the spacer 103, diaphragm 104, ring 105 and ring 106 as a unit towards the front board 101a to be held in place.

In addition, the FET 108 and the chip capacitor 109 are mounted to the inner wall of the base 107, and the output of an electric circuit constituted by these components is electrically connected via through holes 107b, 107c with an output terminal 110a and GND (ground) wiring 110b provided on the outer wall of the base 107. The GND wiring 110b is in turn electrically connected with the capsule 101 at the folded portion 101c. The FET 108 and the chip capacitor 109 are electrically connected with the ring 106 through a wiring (not shown) on the base 107. The ring 106 is electrically connected with the ring 105 which is in turn electrically connected with the vapor-deposited metallic film 104b on the diaphragm 104.

FIG. 9 is a cross-sectional view illustrating the structure of a microphone 200 which is an example of the electret condenser microphone of the prior art back electret type.

As shown in FIG. 9, the microphone 200 includes a capsule 201 in the form of a cylindrical bottom-walled cup made of metal such as aluminum and having an integrally formed front board 201a; cylindrical rings 202 and 208 made of stainless steel or the like; an annular disc-like spacer 203 formed of PET (polyester) or the like; a diaphragm 204 comprising a film 204a such as PET and a metal layer 204b such as nickel vapor-deposited on the film 204a; an FEP 205 which is an electret film subjected to polarization treatment; a plate-like back electrode board 206 formed of stainless steel or the like; a cylindrical insulator holder 207; and a base 209 formed of glass epoxy or the like and having a directivity modulating sound aperture 209a formed therethrough, and an impedance converting FET 210 and a chip capacitor 211 mounted thereon. The front board 201a is formed with receiving sound apertures 201ba, 201bb and 201bc which are through apertures, and the back electrode board 206 has the FEP 205 disposed on the front side surface thereof and is formed with air vents 206a, 206b which are through apertures.

The ring 202, diaphragm 204, and spacer 203 are stacked successively in the order named on the inner side surface of the front board 201a, and the holder 207 and a portion of the back electrode board 206 on the FEP 205 side are disposed on the spacer 203. The ring 208 is further placed on the back electrode board 206, and the base 209 is placed on the holder 207 and ring 208. The thus disposed rings 202, 208, spacer 203, diaphragm 204, back electrode board 206, holder 207 and base 209 are adapted to be forced as a unit towards the front board 201a to be held in place by folding the rear end portion 201c of the capsule 201 inwardly to force an end face of the base 209 towards the front board 201a.

In addition, the FET 210 and the chip capacitor 211 are mounted to the inner wall of the base 209, and the output of an electric circuit constituted by these components is electrically connected via through holes 209b, 209c with an output terminal 212 and GND wiring 212b provided on the outer surface of the base 209. The GND wiring 212b is in turn electrically connected with the capsule 201. The FET 201 and the chip capacitor 211 are electrically connected with the ring 208 through a wiring (not shown) on the base 209. The ring 208 and the ring 202 are electrically connected with the back electrode board 206 and the front board 201a, respectively.

However, the constructions of these prior art electret condenser microphones of FIGS. 8 and 9 have the drawback that it is liable to deteriorate in sensitivity due to ingress of grit and dust (which will be referred to simply as grit hereinafter) from the outside to the electret film.

For example, in the case of the electret condenser microphone of the front electret type as shown in FIG. 8, the FEP 102 which is an electret film is formed directly on the inner surface of the front board 101a. Consequently, the length of ingress path of grit from the outside of the capsule 101 to the FEP electret film 102 is essentially equal to only the depth of the receiving sound aperture 101aa, that is, the thickness of the front board 101a, so that the likelihood of grit in the outside air to reach the FEP 102 is very high. It is empirically known that if the grit reaches and attaches to the FEP electret film 102, the potential of the capacitor comprising the diaphragm 104 and the front board 101a is reduced, leading to deterioration in sensitivity of the microphone 100.

In the case of the electret condenser microphone of the back electret type as well, if the base 209 is provided with the directivity modulating sound aperture 209a to provide bidirectional properties as shown in FIG. 9, grit is likely to find its way through the directivity modulating sound aperture 209a into the capsule. And if the grit which has thus found its way into the capsule further passes through the air vents 206a, 206b to reach the FEP electret film 102, it may result in deterioration in sensitivity of the microphone, as is the case with the front electret type as discussed above.

It is the microphone disclosed in the above mentioned Japanese Utility Model Registration No. 2548543 that was devised to overcome this drawback. The essential part of this device is shown in FIGS. 10 and 11.

FIGS. 10 and 11 illustrate the improved construction of the receiving sound aperture 101aa in the front board 101a of the prior art microphone 100 shown in FIG. 8. FIG. 10 is a cross-sectional view looking in the direction of arrows C from the sectioned plane indicated in FIG. 11.

This improved through aperture comprises a circular, first recess 101-1 cut in the front board 101a from its front face toward the rear side (from the lower side to the upper side of the front board as viewed in FIG. 10) as indicated by the arrow A to a depth Q equal to approximately half the thickness P of the front board, with several (three, for instance) circumferentially spaced joint portions 101-2 (see FIG. 11) left around the inner periphery of the recess. Then, an annular, second recess 101-3 is cut in the front board 101a from its rear face toward the front side to a depth (P−Q+R) somewhat greater than the remaining half (P−Q) of the front board thickness.

It is to be noted that the first and second recesses 101-3 are sized such that the inner diameter of the second annular recess will touch the outer diameter of the first circular recess 101-1 so that the two recesses will communicate with each other through a slit 101-4 having a depth (R). It is to be understood that when the annular recess 101-3 is formed, the area 101-5 left inward of the annular recess is prevented from being separated from the front board by the joint portions 101-2.

With this improved receiving sound aperture (through aperture) formed as discussed above, grit in the outside air may pass through the first recess 101-1 from the front side and find its way via the slit 101-4 having a depth (R) and then through the second recess 101-3 before reaching the FEP film 102. The ingress of grit may be suppressed by setting the depth R of the slit 101-4 to be small.

However, such improved through aperture must be formed by cutting two recesses into the front board from its opposite sides with a highly precise alignment so as to define a slit 101-4 generally in the middle of the thickness of the front board. This undesirably requires the increased cost of manufacture as well as time and trouble in manufacture. In addition, it is solely the slit 101-4 that contributes to suppressing the ingress of grit, and the length of ingress path of grit remains unchanged, that is, it is essentially equal to the thickness of the front board, so that this improved through aperture has been found insufficient with a limited effect of suppressing the ingress of grit.

SUMMARY OF THE INVENTION

This invention addresses the aforesaid prior art problems and contemplates to provide a microphone which is capable of suppressing sensitivity degradation due to ingress of grit from the outside to the electret film.

In order to solve the aforesaid problems, according to this invention, an improvement is provided in the condenser section which is comprised of an electrically conductive vibration diaphragm serving as one electrode; an electrically conductive back electrode board serving as an opposite electrode located in parallel opposition to and spaced from the diaphragm with a predetermined depth of gap with an electrically insulating spacer therebetween; and an electret layer formed on either one of the surface of the back electrode board on the diaphragm side and the surface of the diaphragm on the back electrode board side, and further a cover board affixed to the back electrode board so that it covers the front surface of the back electrode board opposite from the diaphragm side surface to define an improved condenser section. The improved condenser section is accommodated in a capsule to comprise an improved electret condenser microphone.

In the improved condenser section, the cover board is affixed to the back electrode board either it is affixed in intimate contact directly to the back electrode board or it is secured to the back electrode board with an annular disc-like back electrode board spacer interposed therebetween. In addition, the back electrode board and the cover board have respective air vent apertures formed therethrough which are positioned so as not to be in alignment with each other, and in the case of intimate contact to each other, at least one of the intimately affixed surfaces has a connecting slit formed therein which extends perpendicularly to the axis of the air vent apertures and connects the air vent apertures of the back electrode board and of the cover board positioned so as not to be in alignment with each other whereby the electret film is communicated with the outside air through the connecting slit and the air vent apertures of the two boards thus connected by the slit. Alternatively, in the case where the cover board is secured to the back electrode board with an annular disc-like back electrode board spacer interposed therebetween, a gap or space formed between the back electrode board and the cover board and having a predetermined gap depth defined by the back electrode board spacer is adapted to act as the connecting slit whereby the electret film is communicated with the outside air through the connecting slit and the air vent apertures of the two boards connected by the slit. With this construction, it will be appreciated that the length of ingress path of grit from the outside to the electret film may be extended to the length equal to the depth of the air vent aperture(s) acting as the receiving sound aperture(s) formed through the front board plus the depth of the air vent aperture(s) formed through the back electrode board (that is, the thickness of the front board plus the thickness of the back electrode board) and further plus the length of the connecting slit, and that the effect of suppressing the ingress of grit may be enhanced by the provision of the connecting slit. As a result, it is possible to reduce the probability that the grit which may find its way from the outside into the capsule may reach the electret film.

In addition, it should be noted that the grit which has found its way from the outside air into the capsule through the directivity modulating sound aperture is prevented from reaching the electret film by the diaphragm since it is provided on the electret film formed on the back electrode board with a ring-shaped spacer interposed therebetween which is placed on the periphery of the surface of the back electrode board opposite from the front board.

BEST MODES FOR CARRYING OUT THE INVENTION

FIGS. 1A–1F are cross-sectional views illustrating six alternative forms of construction of the improved condenser section according to the present invention. The principle of the present invention will first be explained with reference to these illustrations.

Figure 8:
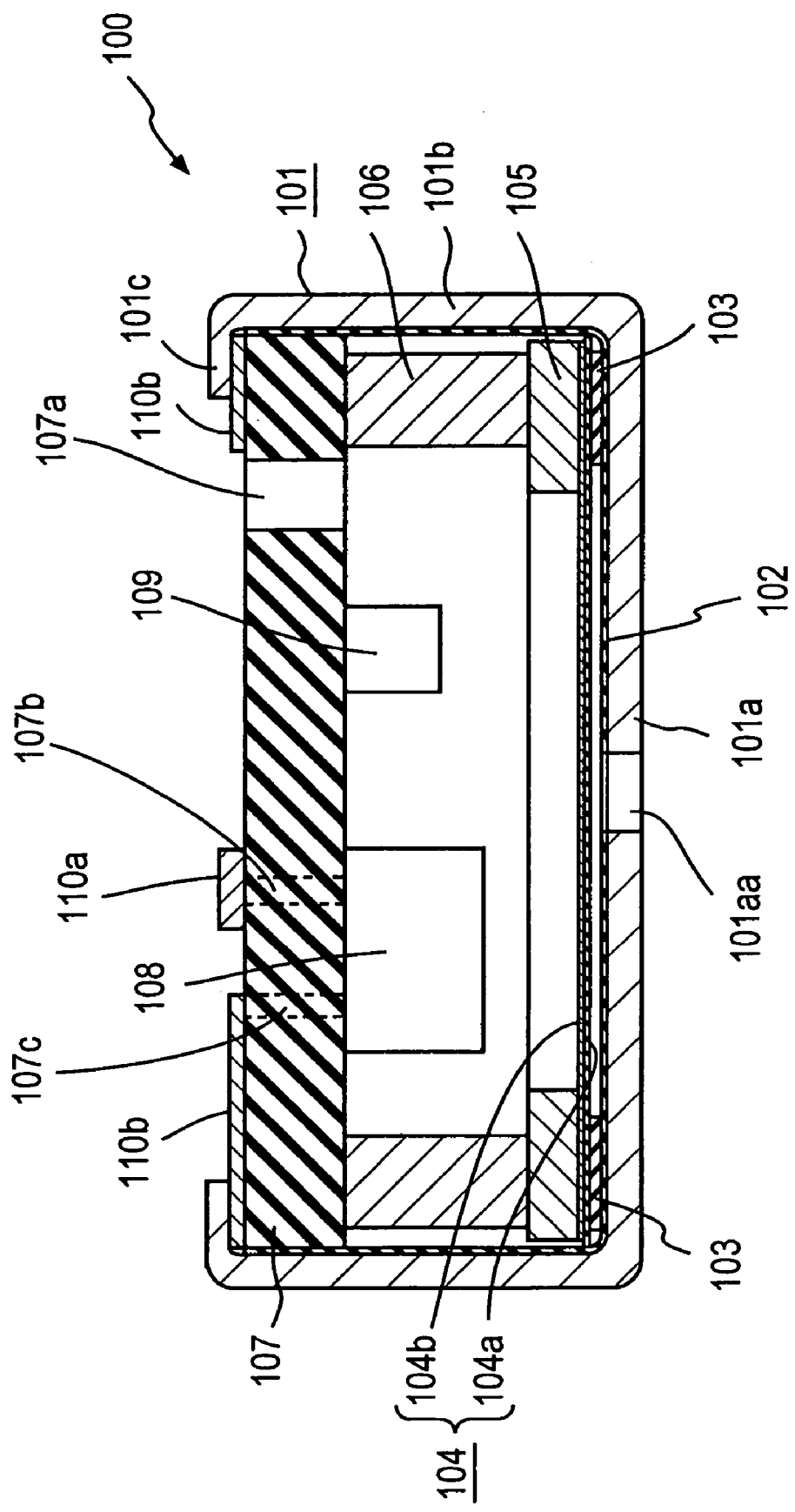
FIG. 8 is a cross-sectional view illustrating the construction of the conventional front electret type condenser microphone.
Figure 9:
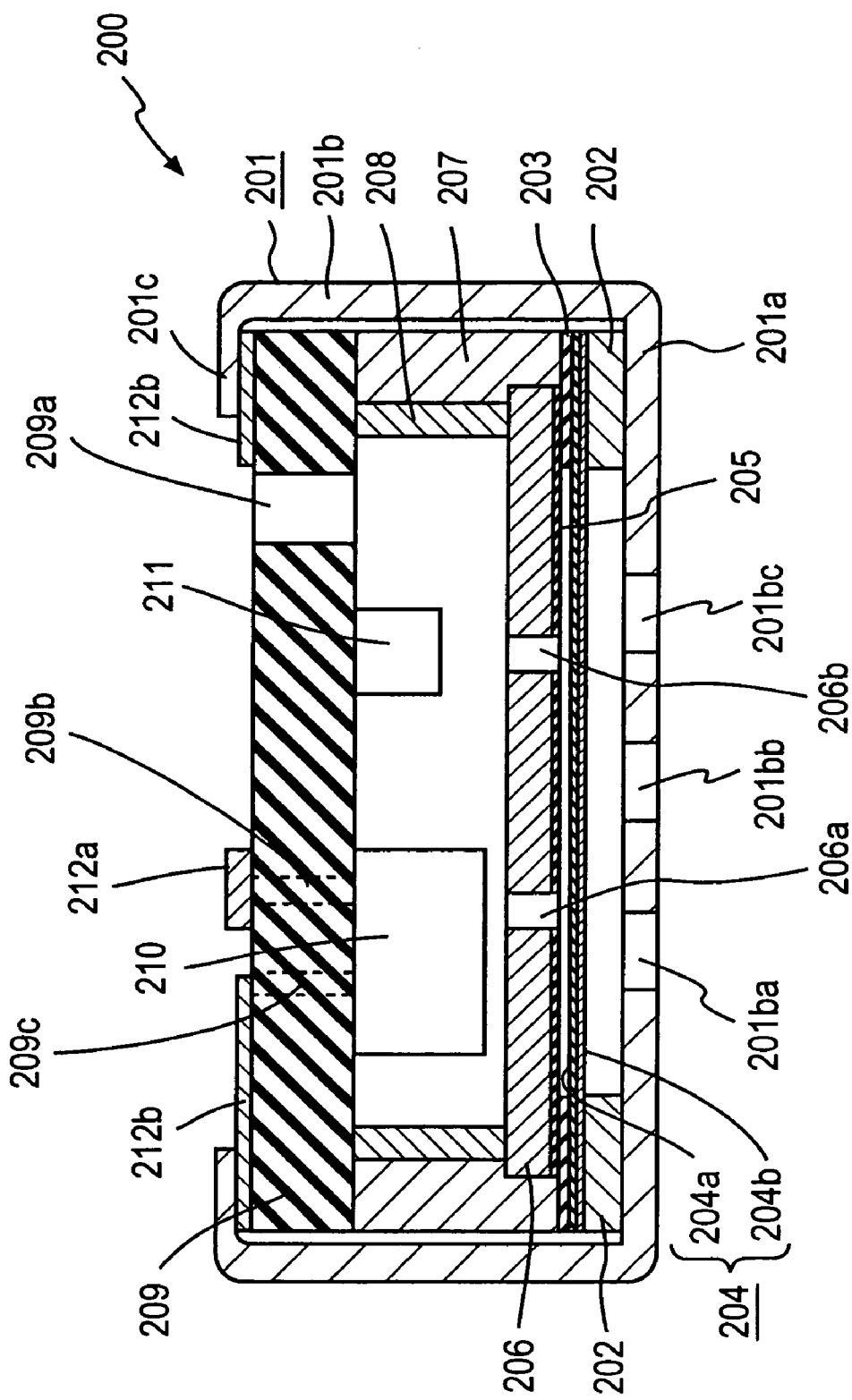
FIG. 9 is a cross-sectional view illustrating the construction of the conventional back electret type condenser microphone.
Figure 10:
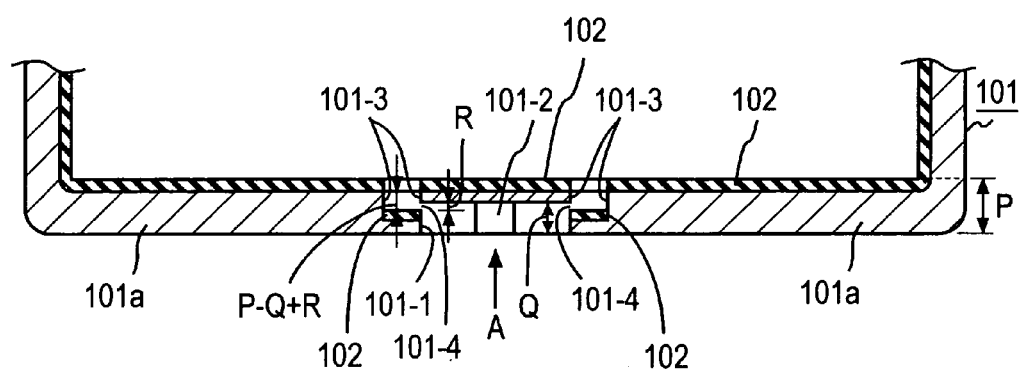
FIG. 10 is a cross-sectional view illustrating the front board section of the still prior art example which improved the prior art as shown in FIG. 8.
Figure 11:
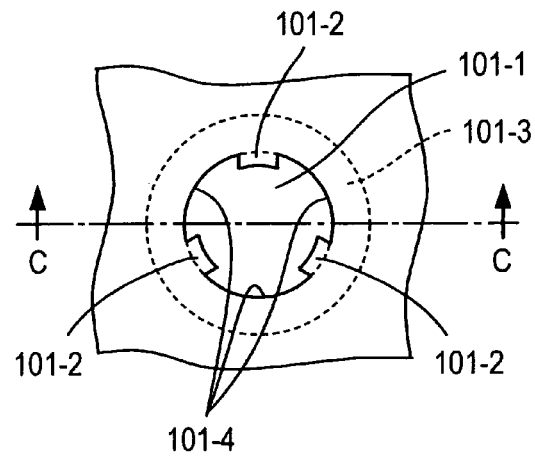
FIG. 11 is a plan view of the central portion of the front board looking in the direction A in FIG. 10.

As is discussed above in The Prior Art section with reference to FIG. 8, the front electret type condenser microphone includes a condenser section comprising a conductive diaphragm 104 constituting one electrode; a front board 101a of a capsule 101 serving as an opposite electrode located in parallel opposition to and at a predetermined spacing from the diaphragm; and an electret film formed on either one (front board 101a, for example) of the opposed surfaces of these boards 104, 101a, the condenser section being accommodated in the conductive capsule 101.

Figure 1A:
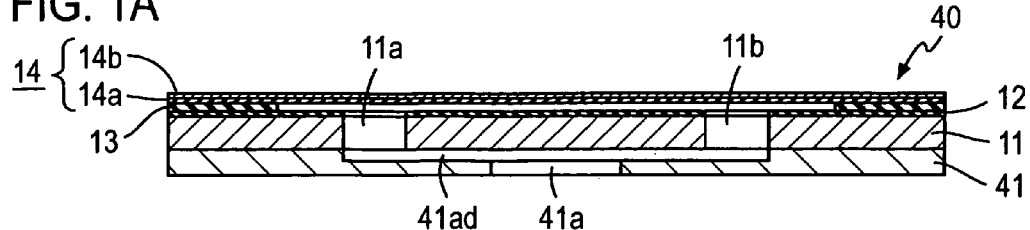
FIGS. 1A–1F are cross-sectional views illustrating six alternative forms of construction of the improved condenser section according to the present invention.

The microphone according to the present invention is provided by improving the prior art condenser section described just above to define an improved condenser section 40 as shown in FIG. 1A and accommodating the improved condenser section 40 in a conductive capsule.

While the capsule 10 is described as being in the form of a cylindrical cup, it is because the front board of the capsule is considered to form one component part of the condenser section. It should be appreciated that the configuration of the capsule is not limited to the cylindrical cup, but in principle may be a cylindrical form with its opposite ends open.

The improved condenser section 40 comprises an electrically conductive vibration diaphragm 14 serving as one electrode, a back electrode board 11 located in parallel opposition to and at a predetermined spacing from the diaphragm, and an electret film 12 formed on either one (the back electrode board 11, for instance) of the opposing surfaces of the back electrode board and the diaphragm, and a cover board 41 affixed in intimate contact to the outer surface of the back electrode board which must necessarily be provided with through apertures 11a, 11b acting as air vent apertures.

The cover board 41 is also provided with a through aperture 41a, but at a location where it does not align with the through apertures 11a, 11b in the back electrode board, and a slit 41ad is formed in the surface of the cover board 41 intimately contacting the surface of the back electrode board to establish communication between the through aperture 41a in the cover board 41 and through apertures 11a, 11b in the back electrode board 11.

The depth of the slit as measured from the aforesaid surface of the cover board, the longitudinal length of the slit and the cross-sectional shape of the slit as viewed in a direction perpendicular to the length thereof are determined so as to enhance the effect of preventing the ingress of grit.

In a microphone constructed by using the improved condenser section 40 obtained as described above, it will be appreciated that the length of ingress path of grit from the outside to the electret film may be extended to the length equal to the depth of the air vent apertures formed in the back electrode board and the cover board plus the length of the connecting slit. This, together with the effect of suppressing the grit ingress by the connecting slit itself, makes it possible to reduce the probability that the grit which may find its way from the outside into the capsule may reach the electret film.

Figure 1B:
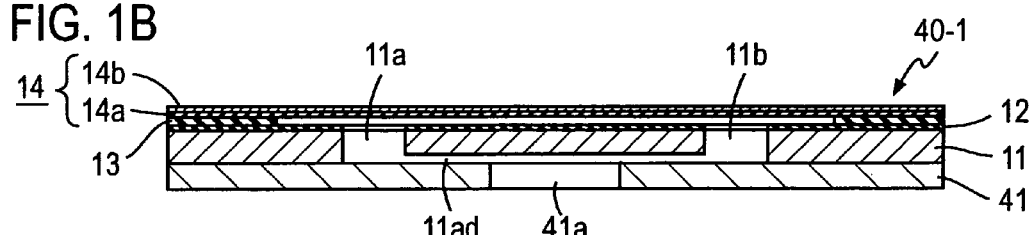

While the improved condenser section 40 having the slit formed in the surface of the cover board intimately contacting the surface of the back electrode board is illustrated in FIG. 1A, the slit may be formed in the surface of the back electrode board intimately contacting the surface of the cover board to provide an improved condenser section 40-1 as shown in FIG. 1B, or alternatively may be formed in both of the intimately contacted surfaces of the two boards, although not shown.

Figure 1C:
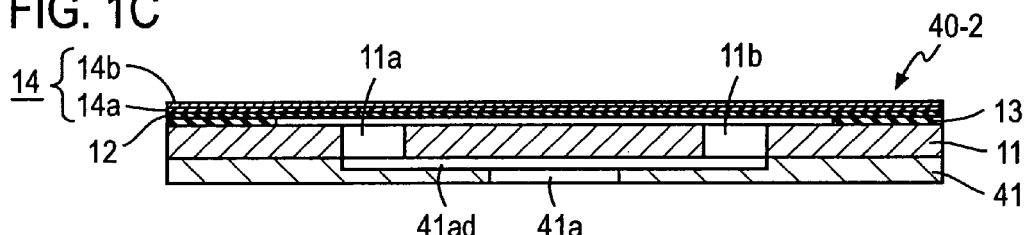
Figure 1D:
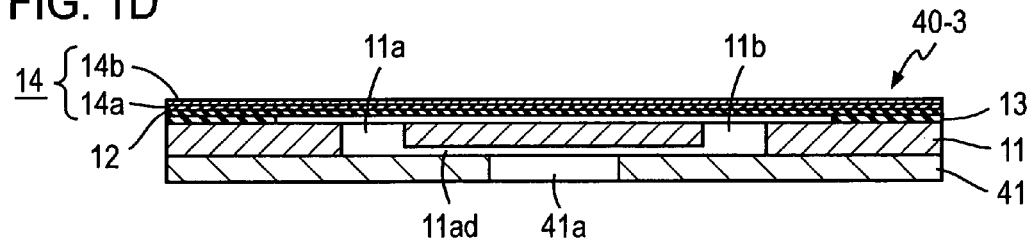

While the electret film is described as being formed on the surface of the back electrode board on the diaphragm side in the foregoing examples, it may be formed on the surface of the diaphragm on the back electrode board side as shown in FIG. 1C. In this instance as well, an improved condenser section 40-2 may be obtained in which the slit is formed in the surface of the cover board intimately contacting the surface of the back electrode board. Or alternatively, an improved condenser section 40-3 may be obtained in which the slit is formed in the surface of the back electrode board intimately contacting the surface of the cover board, as shown in FIG. 1D. In a yet alternative, the slit may be formed in both of the intimately contacted surfaces, although not shown.

Figure 1E:
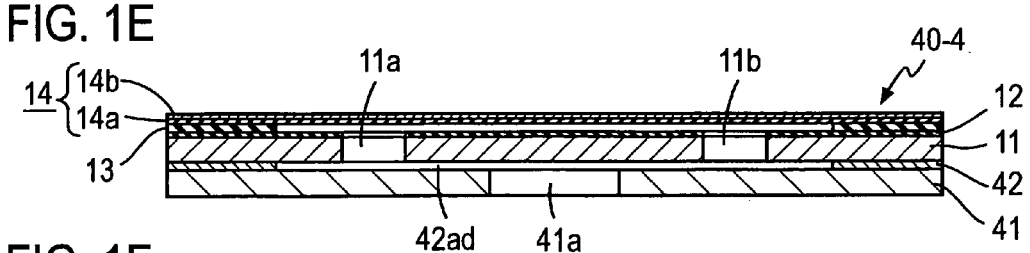
Figure 1F:
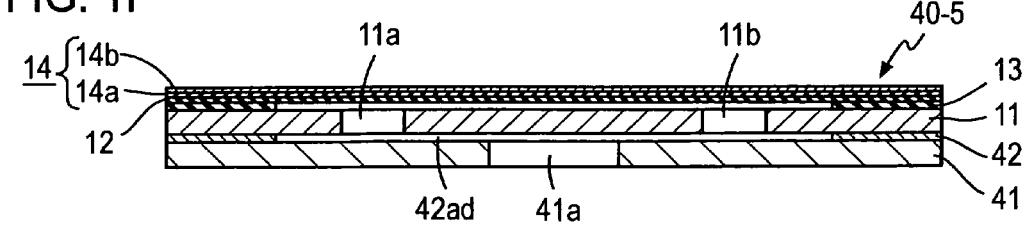

In a still another alternative form, an improved condenser section 40-4 as shown in FIG. 1E may be obtained in which the cover board is affixed to the back electrode board with an annular disc-like, conductive (metal) back electrode board spacer 42 interposed therebetween, and a gap 42ad formed between the back electrode board and the cover board and having a predetermined gap depth defined by the back electrode board spacer 42 is adapted to act as the connecting slit. While the electret film is described as being formed on the surface of the back electrode board on the diaphragm side in this instance of FIG. 1E, an improved condenser section 40-5 may be obtained in which the electret film is formed on the surface of the diaphragm on the back electrode board side, as shown in FIG. 1F.

Desirably, the back electrode board spacer 42 is a conductive annular disc having a very thin thickness just enough to define the aforesaid gap depth. Or alternatively, the back electrode board spacer may be formed on the back electrode board by metal plating or any other appropriate attaching technique if it is desired to make the gap depth defined by the spacer very thin.

Various embodiments of this invention will be described below with reference to the accompanying drawings. It is to be noted that the same or like parts in the various drawings will be referred to by the same reference numbers or symbols and will not be discussed again in detail.

Figure 2:
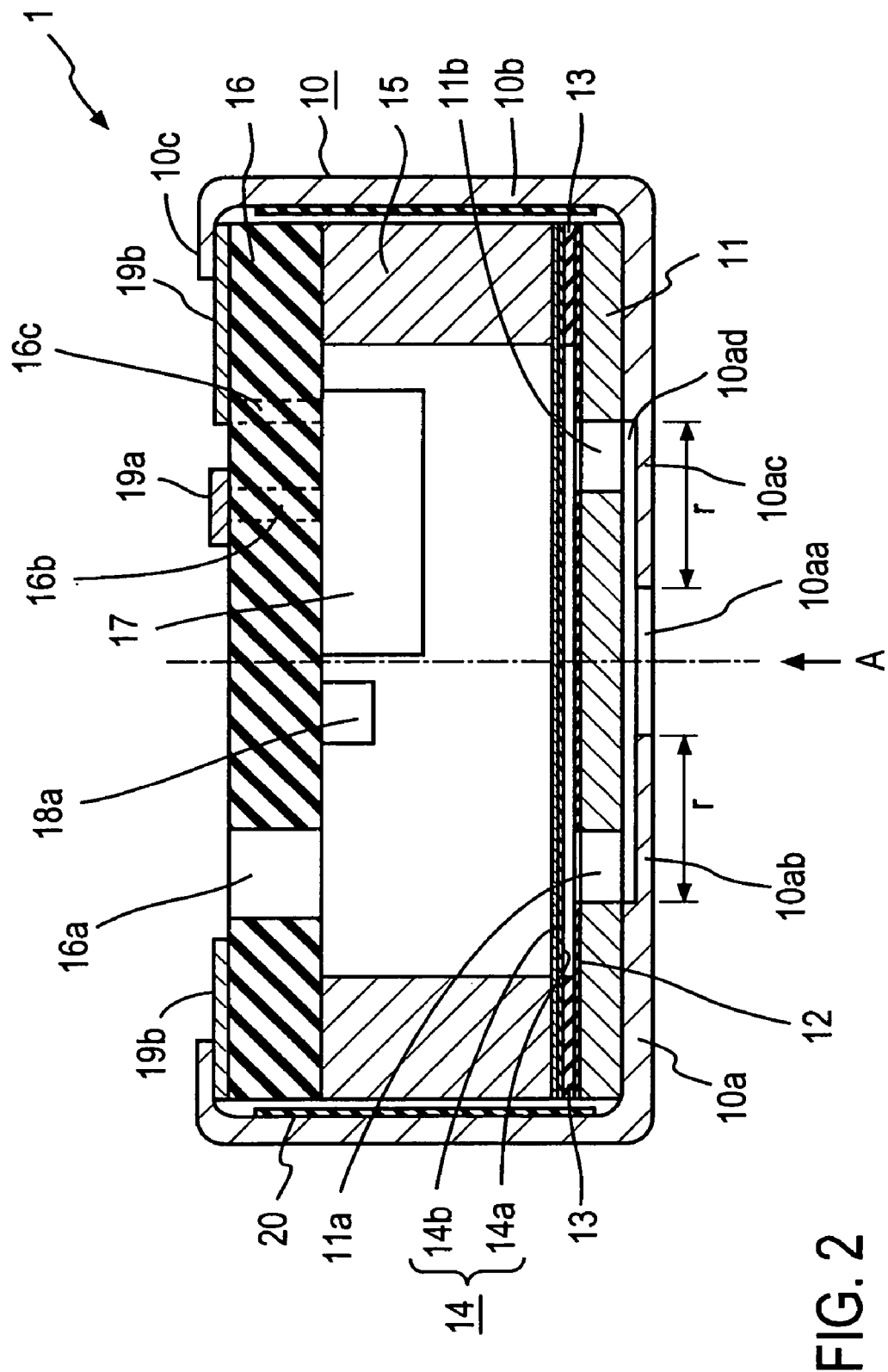
FIG. 2 is a cross-sectional view illustrating the construction of the microphone according to a first embodiment of the present invention.
Figure 3:
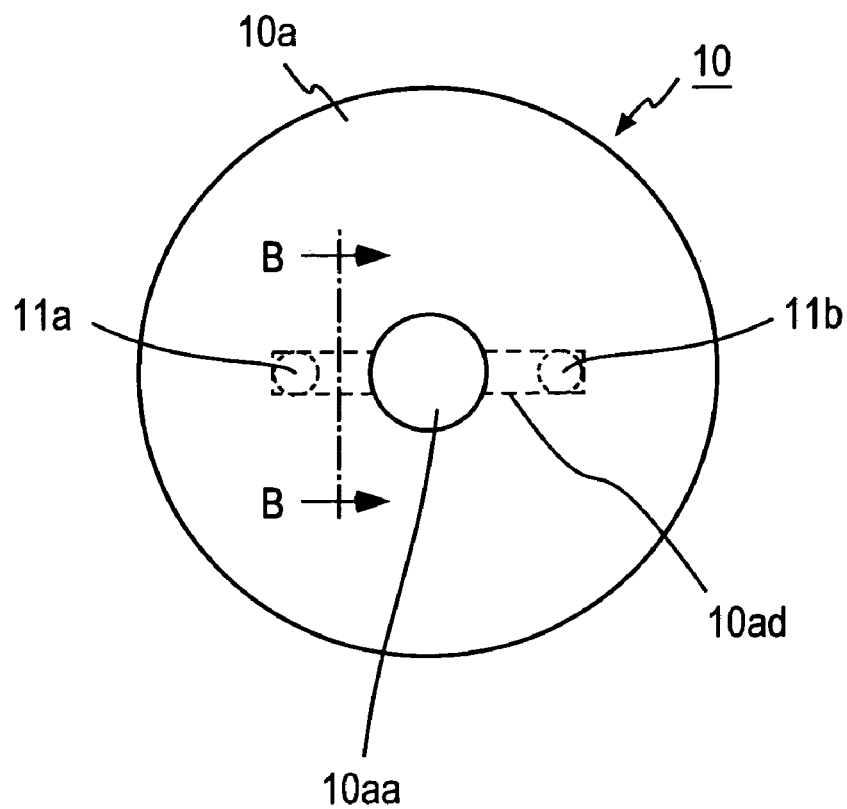
FIG. 3 is a bottom plan view of the microphone looking in the direction A in FIG. 2.

FIG. 2 is a cross-sectional view illustrating the construction of a first embodiment wherein a front electret type condenser microphone 1 is constructed by the use of an improved condenser section 40 according to the present invention, and FIG. 3 is a bottom plan view of the microphone 1 looking in the direction A in FIG. 2.

As shown in FIG. 2, the microphone 1 of this first embodiment includes a capsule 10, a back electrode board 11, an FEP film 12 which is an electret film, a spacer 13, a diaphragm 14, a diaphragm ring 15, a base 16, an FET 17, a chip capacitor 18*a*, an output terminal 19*a*, a GND wiring 19*b*, and an FEP film 20.

The capsule 10 is a structure in the form of a cylindrical bottom-walled cup made of metal such as aluminum. As illustrated in FIG. 2, the bottom (closure wall) or called as a front board 10*a* of the cylindrical bottom-walled cup-like structure is in the form of a circular disc being provided in the center thereof with a receiving sound aperture 10*aa* in the form of a circular through aperture. It is desirable that the diameter of the receiving sound aperture 10*aa* be preferably on the order of $\phi$0.4 mm to $\phi$0.8 mm. The front board 10*a* is formed in its inner surface with a slit 10*ad* which is a groove or a channel-like cavity extending across and intersecting with the receiving sound aperture 10*aa*. The middle portion of the slit 10*ad* is in direct communication with a portion of the opening of the receiving sound aperture 10*aa*. While the slit 10*ad* may be triangular, square, polygonal, circular, elliptical or of any other shape as viewed in a cross-section perpendicular to the length thereof, the slit 10*ad* may be utilized as an acoustic resistance slit in the case where it is formed in a V-shape having a triangular cross-section as viewed perpendicularly to the length thereof.

Figure 4:
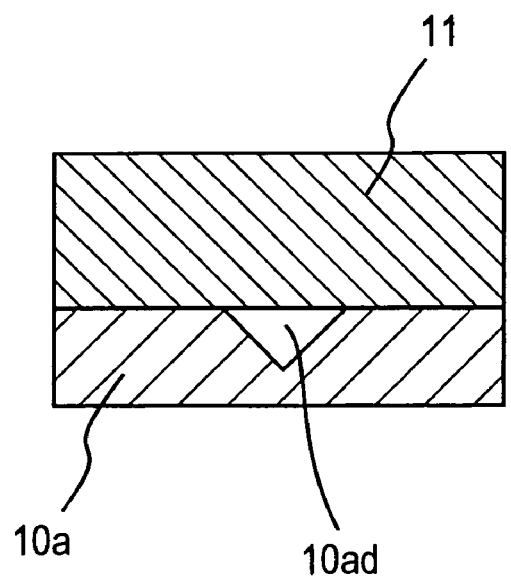
FIG. 4 is a cross-sectional view taken along the line B—B in FIG. 3 illustrating an instance where the slit is adapted to serve as an acoustic resistance slit.

FIG. 4 is a cross-sectional view taken along the line B—B in FIG. 3 illustrating an instance where the slit 10*ad* is adapted to serve as an acoustic resistance slit.

In this instance, as illustrated in FIG. 4, the front board 10*a* is formed in its inner surface with a V-shaped groove or channel, and the space enclosed with this V-shaped groove or channel and a back electrode board 11 disposed on the inner surface of the front board 10*a* (the space triangular in a cross-section) serves as a slit 10*ad*. In the case where this slit 10*ad* is used as an acoustic resistance slit, it is desirable that the depth (or slit gap) of the slit 10*ad* be on the order of 5 µm to 50 µm. In contrast, when the slit 10*ad* is not used as an acoustic resistance slit, it may be desirably 50 µm or greater in depth. Further, for the microphone 1 having a diameter of about $\phi$6 mm, the longitudinal dimension of the slit 10*ad* may be desirably on the order of 2.7 mm to 3.6 mm, but it is not limited to a specific range, provided that the slit is long enough to communicate the receiving sound aperture 10*aa* with air vent apertures 11*a*, 11*b* which will be described later, and it is desirable that the minor dimension (which may be called width) of the slit be a dimension which corresponds to the diameter of the air vent apertures with which the slit is connected, and may be in the range of 0.4 mm to 0.8 mm by way of example.

In this embodiment, the front board 10*a* of the capsule 10 is adapted to function as a cover board affixed in intimate contact to the outer surface of the back electrode board 11 of the condenser section 40 improved according to the present invention.

At a glance, it may be merely promptly judged that this construction is nothing else than 'double-decking' the front board 101*a* acting as a back electrode board in the prior art front electret type condenser microphone shown in FIG. 8 or that it is nothing else than interposing an auxiliary electric conductor layer between the front board 101*a* and the FEP electret film 102 in the prior art example shown in FIG. 8. However, it should be appreciated that this 'double wall' structure is charged with great ingenuities which even those skilled in the art could not easily anticipate, as explained hereinabove in relation to the principle of the present invention.

More specifically, as shown in FIG. 2, the back electrode board 11 is disposed on the inner surface of the front board 10*a* so as to be electrically and mechanically connected with the front board 10*a* in intimate contact state. The back electrode board 11 is a conductive plate-like structure (such as a circular disc, for example) made of brass, stainless steel or the like, and the FEP film 12 is disposed on the surface of the back electrode board 11 on the side opposite from the front board 10*a*. The FEP film 12 should be subjected to polarization treatment to become an electret film after the film disposition, and is preferably on the order of 5 µm to 30 µm, more preferably about 25 µm in thickness. It should be noted that while the electret film is described here as being an FEP, any other polymeric material may be used as the electret film provided that it possesses the electret property.

In addition, the back electrode board 11 is provided with two air vent apertures (through apertures) 11*a*, 11*b* at certain distances radially outward from the center thereof and at such positions as not to align with the receiving sound aperture 10*aa*. As is noted in FIGS. 3 and 4, the air vent apertures 11*a*, 11*b* are configured and arranged such that one ends of the air vent apertures 11*a*, 11*b* will coincide with the opposite ends of the slit 10*ad* formed in the front board 10*a*. With this arrangement, the opening of the receiving sound aperture 10*aa* of the front board 10*a* at the back electrode board 11 side thereof is covered by a receiving sound aperture covering portion 11*ab* of the back electrode board, while the openings of the air vent apertures 11*a*, 11*b* of the back electrode board at the front board 10*a* side thereof are covered by air vent covering portions 10*ab*, 10*ac*, respectively of the front board 10*a*, so that at least portions of the openings of the air vent apertures 11*a*, 11*b* at the front board 10*a* side and at least a portion of the opening of the receiving sound aperture 10*aa* at the back electrode board 11 side are connected with each other by the slit 10*ad* comprising a cavity in a direction perpendicular to the axes of these apertures, which direction is longitudinal of the slit and parallel to the intimately contacted surfaces of the two boards.

It is desirable that the diameter of the air vent apertures 11*a*, 11*b* be preferably on the order of $\phi$0.4 mm to $\phi$0.8 mm, and that the distance from the center of the back electrode board 11 to the air vent apertures 11*a*, 11*b* be preferably on the order of 0.3 mm to 0.8 mm where the diameter of the entire microphone 1 is $\phi$4 mm to $\phi$10 mm. In addition, it is desirable that the thickness of the back electrode board 11 be preferably on the order of 0.2 mm to 0.8 mm. The distance r from the opposite ends of the slit 10ad to the outer peripheral edge of the receiving sound aperture 10aa is preferably equal to or greater than the diameter of the air vent apertures 11a, 11b, and more preferably on the order of 0.9 mm to 1.3 mm. The number of the air vent apertures 11a, 11b is not limited to two, but may be more or less than two. Further, their shape is not limited to a circular shape, but it is desirable that the air vent apertures 11a and 11b be formed at positions symmetrical about the center of the receiving sound aperture 10aa for the sake of the frequency characteristic.

The spacer 13 is disposed on the surface of the FEP electret film 12 on the side opposite from the back electrode board 11. The spacer 13 is a plate-like insulator made of polymeric material such as PET, and practically it is preferably in the form of a circular, annular disc (generally doughnut-shaped) having a central opening. As illustrated in FIG. 2, the spacer 13 is arranged such that its outer peripheral edge coincides with the outer peripheral edges of the back electrode board 11 and the FEP film 12 with the planar surface of the spacer in contact with the FEP film 12. In addition, the spacer 13 is configured and arranged such that the air vent apertures 11a, 11b of the back electrode board are positioned within the central opening of the spacer, so that the air vent apertures 11a, 11b are not closed by the spacer 13. It is desirable that the thickness of the spacer 13 be on the order of 16 µm to 50 µm and that the width (difference between the radii of the outer and inner peripheries) of the annular portion of the spacer 13 be on the order of 0.4 mm to 0.8 mm.

The diaphragm 14 is disposed on the surface of the spacer 13 on the side opposite from the back electrode board 11. The diaphragm 14 is an electrically conductive membrane comprising a polymeric molecular film 14a such as PET and a metallic film such as nickel (Ni), aluminum (Al), titanium (Ti) or the like vapor deposited on one side surface of the polymeric molecular film to form a conductive layer 14b. It is desirable that the thickness of the polymeric molecular film be on the order of 2 µm to 4 µm and that the thickness of the metallic film be on the order of 200 Å to 300 Å.

The diaphragm 14 is configured and arranged such that its outer peripheral edge coincides with the outer peripheral edge of the spacer 13 and is disposed on the spacer 13 with the conductive layer side (metallic film 14b) facing the diaphragm ring 15. The diaphragm 14 is thus sandwiched and firmly secured between the diaphragm ring 15 and the spacer 13 with a predetermined gap spaced by the thickness of the spacer 13 from the FEP film 12. Desirably, this gap is on the order of 16 µm to 50 µm.

The diaphragm ring 15 is a cylindrical member which may be made of brass, stainless steel or the like. The diaphragm ring 15 is configured and arranged such that its outer peripheral edge coincides with the outer peripheral edge of the spacer 13 to thereby secure the diaphragm 14 as mentioned above and to electrically connect the ring 15 with the conductive layer 14b of the diaphragm 14. Desirably, the conductive layer 14b of the diaphragm 14 is bonded to the diaphragm ring 15 by a conductive adhesive, for example.

While the height of the diaphragm ring 15 depends on the height of the entire microphone 1, it is desirable that the height of the diaphragm ring 15 be on the order of 0.6 mm to 2.0 mm for the microphone 1 having a height of about 1 to 3 mm. It is to be noted that the diaphragm ring 15 may be two separable rings and disposed on the diaphragm 14 side and the base 16 side, respectively. In this instance, the height of the ring on the diaphragm 14 side is desirably on the order of 0.3 mm to 0.5 mm while the height of the ring on the base 16 side is desirably on the order of 0.3 mm to 1.5 mm (assuming that the height of the entire microphone 1 is on the order of 1 to 3 mm). Further, it is desirable that the lateral thickness (difference between the radii of the outer and inner peripheries) of the diaphragm ring 15 be on the order of 0.4 mm to 0.8 mm.

The base 16 is disposed on the end of the diaphragm ring 15 opposite from the diaphragm 14. The base 16 is a disc-like plate formed of an insulator such as glass epoxy (FR-4, for example) or the like and is provided in its inner surface with an electric wiring (not shown) which is electrically connected with the diaphragm ring 15. In addition, mounted on the inner surface of the base 16 are the impedance converting FET 17 and the chip capacitor 18a which are electrically interconnected by electric wiring (not shown) to constitute an electric circuit. The base 16 is further provided with through holes 16b, 16c the interior surfaces of which are formed with metallic film. The output of the electric circuit formed in the inner surface of the base 16 is electrically connected via the through hole 16b with the output terminal 19a formed on the outer surface of the base 16 while the GND of the electric circuit formed in the inner surface of the base 16 is electrically connected via the through hole 16c with the GND wiring 19b provided on the outer surface of the base 16. The GND wiring 19b is in turn electrically connected with one end 10c, for example, of the capsule 10. It is desirable that the thickness of the base 16 be on the order of 0.2 mm to 0.8 mm.

Moreover, the base 16 has a directivity modulating sound aperture 16a formed therethrough. It is desirable that the directivity modulating sound aperture 16a be φ0.3 mm to φ1 mm in diameter and that it be located at a distance of about 1 mm to 2 mm from the center of the base 16 (for the entire microphone 1 having a diameter of about φ4 mm to φ10 mm). The number of the directivity modulating sound aperture 16a is not limited to one, but may be more than one. Further, its shape is not limited to a circular shape, either.

As shown in FIG. 2, the inner surface of the cylindrical side wall 10b of the capsule 10 is formed with an insulator film such as FEP film 20. The FEP film 20 acts to prevent the diaphragm ring 15 and the capsule 10 from contacting each other to electrically short-circuit the diaphragm ring 15 with the capsule 10. It is desirable that the FEP film 20 be on the order of 5 µm to 20 µm in thickness. In place of the FEP film 20, any other suitable insulating materials such as PET may be used.

With further reference to FIG. 2, the open rear end (the end opposite from the front board 10a) of the capsule 10 is folded inwardly as a folded end portion 10c to firmly hold a portion of the base 16, whereby the back electrode board 11, FEP film 12, spacer 13, diaphragm 14, diaphragm ring 15 and base 106 are entirely sandwiched and held in place between the folded end portion 10c and the inner surface of the front board 10.

Next, a method of manufacturing the microphone 1 of FIG. 2 will be described by way of example.

The Capsule 10:

For example, a planar plate of aluminum or the like is formed with a slit 10ad and a receiving sound aperture 10aa as by a pressing process. Then, insulator FEP film 20 is heat welded in the from of a strip to a portion of the thus pressed planar aluminum plate, followed by drawing the resulting planar aluminum plate to form a capsule 10 in the shape of a cylindrical bottom-walled cup having a front board 10a which is a closure wall.

The Back Electrode Board 11:

For example, FEP film 12 is heat welded to a planar plate of brass or the like. After being subjected to polarization treatment, the resulting planar plate is formed with air vent apertures 11a, 11b as by pressing process and/or machining process to form a back electrode board 11.

The Diaphragm 14:

For example, a diaphragm 14 is formed by depositing metal such as Ti or the like entirely on one side surface of a polymeric molecular sheet 14a such as PET or the like as by a sputtering process.

The Assembly:

For example, the back electrode board 11, spacer 13, diaphragm 14, diaphragm ring 15 and base 16 are stacked successively in the order named on the inner surface of the front board 10a and are securely held in place in the capsule 10 by folding the rear end of the capsule 10 as described above.

As discussed above, in this first embodiment, the back electrode board 11 provided with air vent apertures 11a, 11b is placed on the inner surface of the front board 10a while the polarized FEP electret film 12 is disposed on the surface of the back electrode board 11 opposite from the front board 10a, and the diaphragm 14 is disposed in opposition to the back electrode board 11 on the surface of the FEP electret film 12 opposite from the back electrode board 11 with the spacer 13 interposed therebetween which extends around the outer periphery of the opposite surface of the FEP electret film 12 to thereby constitute a condenser section.

As previously described, the slit may be formed in either one of the intimately contacted surfaces of the front board 10a and the back electrode board 11, the slit 10ad is formed in the surface of the front board 10a on the back electrode board 11 side in this first embodiment, and the openings of the air vent apertures 11a, 11b on the front board 10a side is covered by the air vent covering portions 10ab, 10ac, respectively of the front board 10a while the opening of the receiving sound aperture 10aa on the back electrode board 11 side is covered by the back electrode board side 11 so that at least portions of the openings of the air vent apertures 11a, 11b on the front board 10a side and at least a portion of the opening of the receiving sound aperture 10aa on the back electrode board 11 side are communicated with each other by the slit 10ad.

With this arrangement, the length of ingress path of grit from the outside to the FEP electret film 12 may be extended to the length equal to the depth of the receiving sound aperture 10aa formed through the front board 10a plus the depth of the air vent apertures 11a, 11b of the back electrode board 11 further plus the length of the slit 10ad. Especially, the addition of the slit 10ad provides for making the ingress passage for grit from the receiving sound aperture 10aa to the FEP 12 relatively thin as compared with the diameter of the aperture to thereby enhance the effect of preventing the ingress of grit. As a result, it is possible to reduce the probability that any grit which has found its way from the outside into the capsule may reach the electret film, whereby deterioration in sensitivity of the microphone 1 due to ingress of grit may be suppressed.

In addition, any grit which has found its way into the capsule through the directivity modulating sound aperture 16a is prevented from reaching the FER electret film 12 by the diaphragm 14, whereby sensitivity degradation of the microphone 1 due to ingress of grit through this route may also be prevented.

It is further to be appreciated that if the slit 10ad is formed as a V-shaped groove or channel so as to be triangular in a cross-section perpendicular to the length thereof, it may function as an acoustic resistance slit.

Additionally, the characteristic of the microphone 1 may be rendered unidirectional if the construction is such that die directivity modulating sound aperture 16a is eliminated.

Alternatively, the characteristic of the microphone 1 may be nondirectional by forming the slit 10ad so as not to act as an acoustic resistance slit and eliminating the directivity modulating sound aperture 16a.

In a still another form, the characteristic of the microphone 1 may be bidirectional by forming the slit 10ad so as not to act as an acoustic resistance slit and providing the directivity modulating sound aperture 16a.

Furthermore, in this embodiment, since the FEP electret film 12 is disposed on the back electrode board 11 placed on the inner surface of the front board 10a, the resultant microphone may have a high acoustic performance comparable to that of the microphone of the conventional back electret type.

To top it all, the present invention does not require the ring 202 as required in the conventional back electret type microphone 200 shown in FIG. 8, so that it allows for slimming the microphone (lowering the profile of the microphone) by the thickness of the ring 202. It is thus to be appreciated that the present invention provides for downsizing and slimming while retaining the performance of the microphone of the conventional back electret type.

Heretofore, the ring 202 has required a thickness of 0.2 mm at the minimum and greater than that. The reason is that if the ring 202 is made thinner than that, the ring 202 would become distorted under the stress from the base 209 side during the crimping of the microphone 200 (folding of the open end of the capsule inwardly and downwardly) and hence the diaphragm 204 bonded to the ring 202 would also be distorted, resulting in deleteriously affecting the acoustic performance. Therefore, this embodiment eliminating the need for providing the ring 202 allows for lowering the profile of the microphone by greater than 0.2 mm as compared with the prior art.

Alternatively, if the interior volume of the microphone 1 is increased by a volume equivalent to that of the ring 202 without reducing the profile of the microphone, the nondirectionality of the microphone 1 may be correspondingly enhanced. As a result, the present invention makes it possible to enhance the performance of the microphone while maintaining the size of the conventional back electret type microphone.

In addition, the number of component pails required may be reduced by omitting the ring 202, and hence the cost of manufacture as well as the cost of parts may be reduced.

Further, in this embodiment, since the diaphragm 14 is adhesively bonded to the diaphragm ring 15 having an adequate thickness, the distortion which the diaphragm 14 may suffer during the crimping step may be greatly reduced as compared with the prior art in which the diaphragm 204 was bonded to the thin ring 202.

It is understood by those skilled in the art that the present invention is not limited to the embodiment described above.

Figure 5:
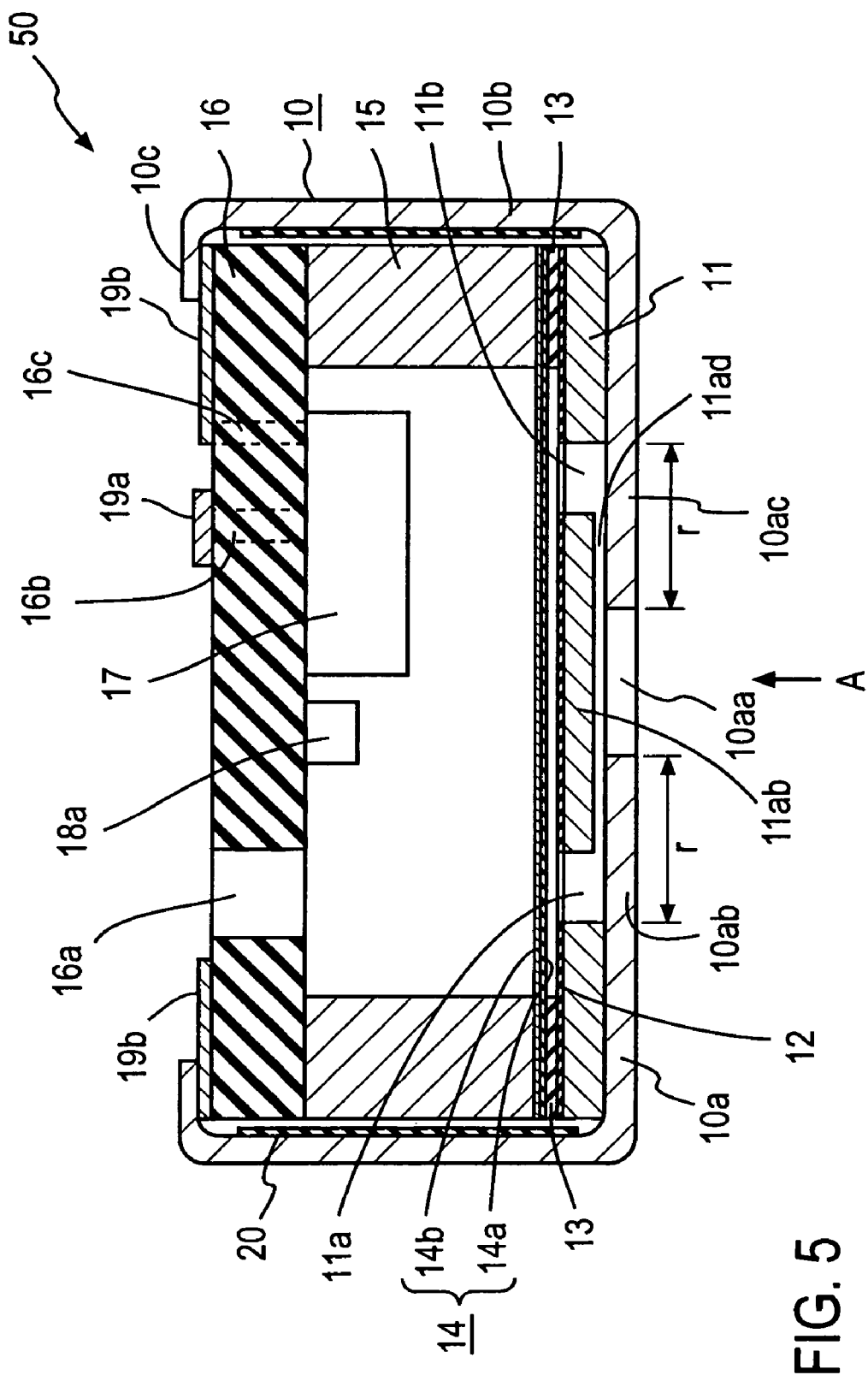
FIG. 5 is a cross-sectional view illustrating the construction of the microphone according to a second embodiment of the present invention.

For example, while in this first embodiment, the slit 10ad is formed in the inside surface of the front board 10a as shown in FIG. 2, a slit 1 lad may be formed in the surface of the back electrode board 11 on the front board 10a side as in the microphone 50 illustrated as a second embodiment in FIG. 5, rather than forming a slit in the front board 10a. With this arrangement, the opening of the receiving sound aperture 10*aa* on the back electrode board side is covered by air vent covering position 11*ab* of the back electrode board 11 while the openings of the air vent apertures 11*a* and 11*b* on the front board side are covered by air vent covering portions 10*ab* and 10*ac* of the front board 10*a*.

The slit 11*ad* may be a groove or channel formed in the surface of the back electrode board 11 on the front board 10*a* side so as to connect the openings of said two air vent apertures 11*a* and 11*b* across the receiving sound aperture 10*aa* such that the middle portion of the slit 11*ad* communicates directly with a portion of the opening of the receiving sound aperture 10*aa*. While the slit 11*ad* may be triangular, square, polygonal, circular, elliptical or of any other shape as viewed in a cross-section perpendicular to the length thereof, the slit 11*ad* may be utilized as an acoustic resistance slit if it is formed as a V-shaped groove or channel so as to be triangular in a cross-section as viewed perpendicularly to the length thereof.

Figure 6:
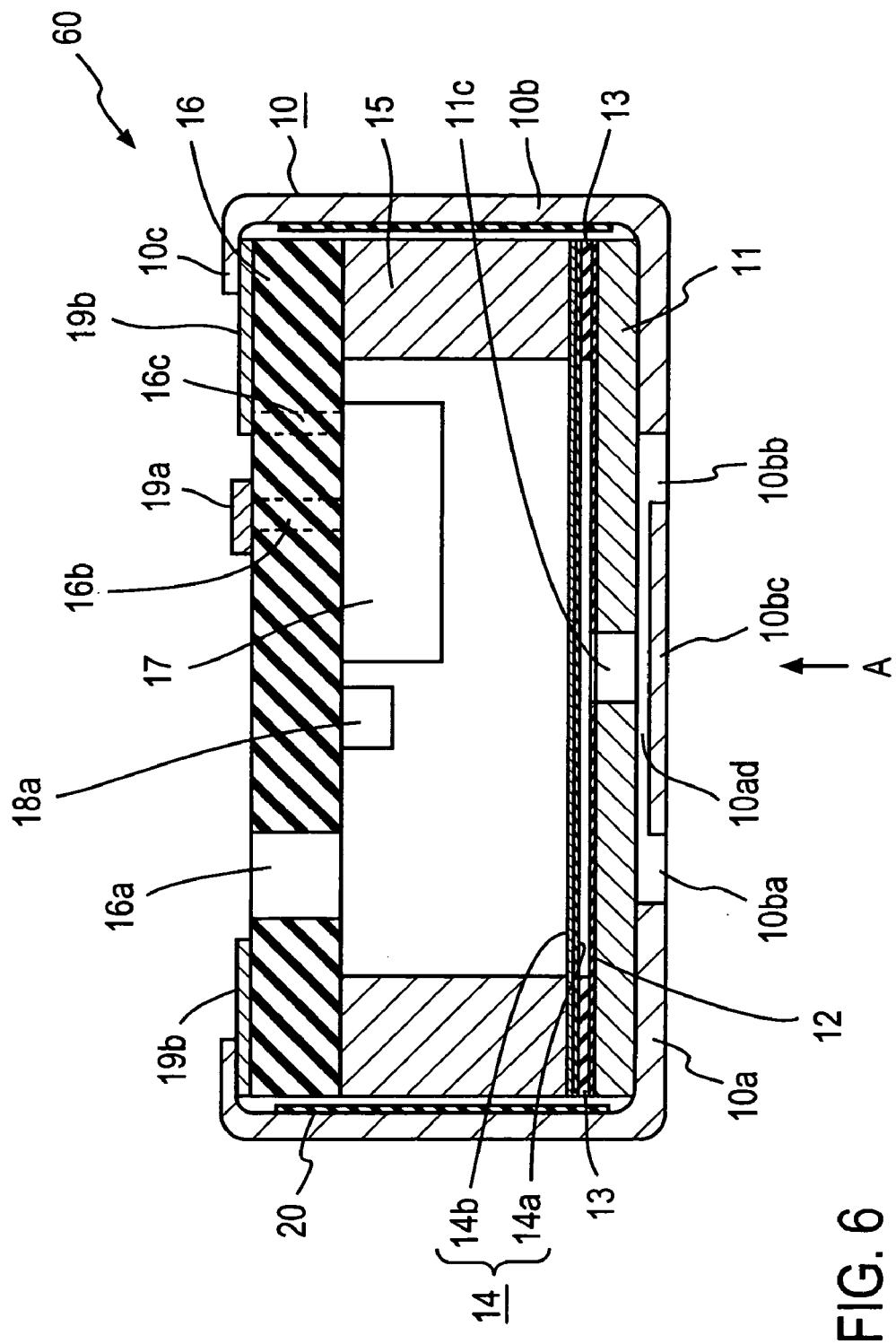
FIG. 6 is a cross-sectional view illustrating the construction of the microphone according to a third embodiment of the present invention.

FIG. 6 illustrates a microphone 60 according to a third embodiment in which an air vent aperture 11*c* is formed through the back electrode board 11 while two receiving sound apertures 10*ba*, 10*bb* are formed through the front board 10*a* at predetermined distances radially outwardly from the center thereof (at positions where the through apertures of the two boards do not align with each other). With this arrangement, the opening of the air vent aperture 11*c* on the front board side is covered by an air vent covering portion 10*bc* of the front board 10*a* while the openings of the two receiving sound apertures 10*ba*, 10*bb* on the back electrode board side are covered by air vent covering portions of the back electrode board 11.

In this case, a slit 10*ad* is formed in the inner surface of the front board 10*a* so as to connect the openings of the two receiving sound apertures 10*ba*, 10*bb* at the back electrode board side and such that the central portion of the slit 10*ad* is communicated directly with the opening of the air vent aperture 11*c* on the front board 10*a* side.

Accordingly, the air vent aperture 11*c* and the receiving sound apertures 10*ba*, 10*bb* are communicated with each other through the slit 10*ad*. Desirably, the receiving sound apertures 10*ba* and 10*bb* are positioned symmetrically about the longitudinal midpoint of the front board 10*a*. In this microphone 60, it is to be appreciated that the slit 10*ad* may be formed in the back electrode board 11 in a manner same as in the embodiment illustrated in FIG. 5, rather than in the front board 10*a*. (not shown)

Figure 7:
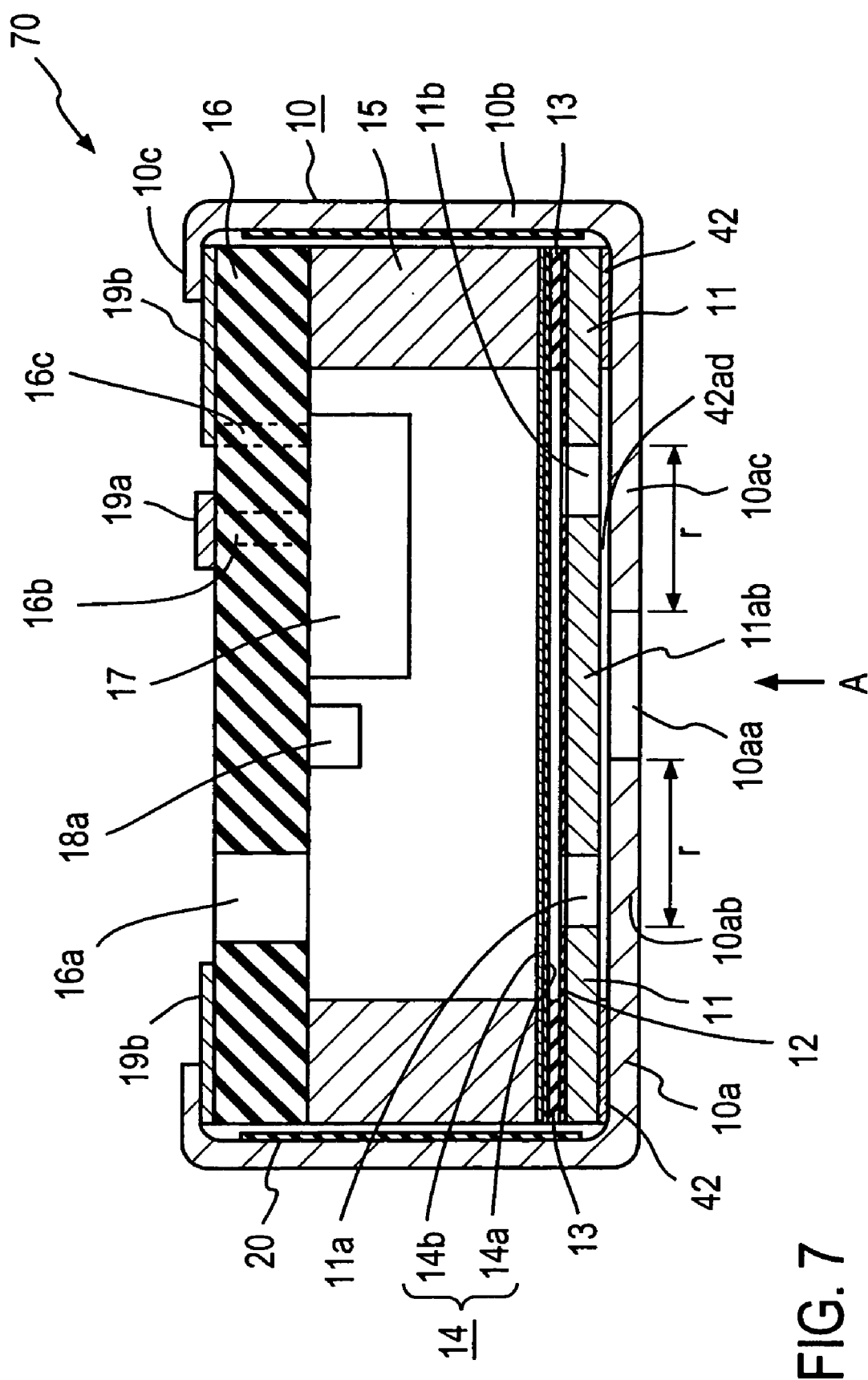
FIG. 7 is a cross-sectional view illustrating the construction of the microphone according to a fourth embodiment of the present invention.

FIG. 7 illustrates a microphone 70 according to a fourth embodiment in which no slit is formed in either the inside surface of the front board 10*a* or the surface of the back electrode board 11 on the front board 10*a* side, and instead the back electrode board is placed over and secured to the inside surface of the front board 10*a* with an annular disc-like, electrically conductive back electrode board spacer 42 interposed therebetween so that a gap 42*ad* having a gap depth determined by the back electrode board spacer 42 is defined between the back electrode board and the front board 10*a* acting as the cover board. The front board 10*a* is formed generally in its center with a through aperture comprising a receiving sound aperture 10*aa* while the back electrode board 11 is provided with two air vent apertures 11*a*, 11*b* at predetermined distances radially outward from the center thereof (that is, at positions where the apertures 11*a*, 11*b* are not axially aligned with the receiving sound aperture 10*aa*). With this arrangement, the openings of the air vent apertures 11*a*, 11*b* of the back electrode board 11 at the front board 10*a* side are covered by air vent covering portions 10*ab*, 10*ac*, respectively of the front board 10*a* while the opening of the receiving sound aperture 10*aa* of the front board 10*a* at the back electrode board 11 side is covered by a receiving sound aperture covering portion 11*ab* of the back electrode board 11, and the gap 42*ad* defined between the back electrode board and the front board (the cover board) and having a gap depth determined by the back electrode board spacer 42 is adapted to act as the aforesaid connecting slit, so that the receiving sound aperture 10*aa* of the front board 10*a* and the two air vent apertures 11*a*, 11*b* of the back electrode board 11 are connected with each other by this connecting slit 42*ad*.

Like the other embodiments, this embodiment is also capable of a modified form in which the back electrode board is provided with a single air vent aperture rather than two air vent apertures 11*a*, 11*b* while the front board 10*a* is provided with two receiving sound apertures instead of the single receiving sound aperture 10*aa* and a further modified form in which the electret film is disposed on the surface of the diaphragm 14 on the back electrode board 11 side rather than on the surface of the back electrode board 11 on the diaphragm 14 side. (not shown)

As such, the role of the connecting slit in this embodiment is filled by the gap between the back electrode board and the cover board. It will be appreciated that this embodiment is very useful in the case that the two boards are extremely thin so that if a slit is formed in the surface of either one of the boards, the strength of the board would be exceedingly weakened.

This connecting slit or gap as shown in FIG. 7 is also defined so as to extend perpendicularly to the axes of the through apertures formed in both the cover board and the back electrode board, and is, therefore, apparently equivalent to the connecting slit in the other embodiments which is formed in either one or both of the surfaces of the back electrode board and the cover board which are secured together in intimate contact.

As discussed hereinabove, according to this invention, a front board (cover board) having a receiving sound aperture formed therethrough is placed over and affixed to a back electrode board having air vent apertures formed therethrough at positions not aligning with the receiving sound aperture of the front board, and the receiving sound aperture and the air vent apertures are communicated with each other in a direction perpendicular to the axes of the apertures by a slit defined between the front board and the back electrode board. With this construction, the length of ingress path of grit from the outside is extended to a length greater than the combined thicknesses of the two boards, whereby any grit which has found its way from the outside into the microphone is prevented from reaching the electret film. Consequently, deterioration in sensitivity of the microphone due to the grit attaching to the electret film may be reduced.

What is claimed is:

1. An electret condenser microphone comprising:
   a condenser section that comprises:
   an electrically conductive diaphragm,
   an electrically conductive back electrode board disposed in parallel opposition to said diaphragm with a gap space therebetween, and
   an electret film formed on a surface of said back electrode board facing the diaphragm or on a surface of said diaphragm facing the back electrode board; and
   a capsule accommodating said condenser section therein, said capsule having a side wall and a cover board affixed to a surface of said back electrode board facing away from the diaphragm so that said cover board and said back electrode board form a complex front board arrangement for the microphone; wherein said back electrode board has a first through-aperture formed therethrough to communicate at on one end thereof to the gap space between the diaphragm and the back electrode board;

said cover board has a second through-aperture formed therethrough which communicates an one end thereof to an outside of said electret condenser microphone, and is positioned so as not to be in alignment with the first through-aperture with a distance therebetween which is longer than either thickness of the back electrode board and the cover board; and said complex front board arrangement has a connecting path at an interface including opposing surfaces of said cover board and said back electrode board, wherein the connecting path extends perpendicularly to axes of said first and second through-apertures and is connected to the first and second through-apertures;

whereby said electret film communicates with the outside through said connecting path and said first and second through-apertures, and an ingress of grit from the outside to said electret film is suppressed by said connecting path.

2. The microphone as set forth in claim 1 wherein:
a surface of said cover board is affixed in intimate contact to a surface of said back electrode board, and
said connecting path of the complex front board arrangement is a connecting slit formed in at least one of the intimately affixed surfaces of the back electrode board and the cover board.

3. The microphone as set forth in claim 2 wherein:
said connecting slit is formed as a V-shaped groove or channel in the surface of either one of the back electrode board and the cover board in which it is formed to a depth of up to 50 μm so as to serve as an acoustic resistance slit.

4. The microphone as set forth in claim 2 wherein:
said capsule is in the form of an electrically conductive cylindrical cup having a front board serving as said cover board; and
said connecting slit of the complex board arrangement is formed in a surface of said front board facing the back electrode board.

5. The microphone as set forth in claim 2 wherein:
said capsule is in the form of an electrically conductive cylindrical cup having a front board serving as said cover board; and
said connecting slit of the complex board arrangement is formed in a surface of said back electrode board facing he front board.

6. The microphone as set forth in claim 4 wherein said electret film is disposed on the surface of said diaphragm facing the back electrode board.

7. The microphone as set forth in claim 5 wherein said electret film is disposed on the surface of said diaphragm facing the back electrode board.

8. The microphone as set forth in claim 1 wherein:
said complex front board arrangement further comprises an annular disk-shaped spacer;
said cover board is affixed to said back electrode board with said annular disk-shaped spacer interposed therebetween;
a gap space is formed at said interface between said back electrode board and said cover board and
said gap space is adapted to act as said connecting path of the complex front board arrangement.

9. The microphone as set forth in claim 8 wherein:
said capsule is in the form of an electrically conductive cylindrical cup having a front board serving as said cover board; and
said electret film is disposed on the surface of said back electrode board facing said diaphragm.

10. The microphone as set forth in claim 8 wherein:
said capsule is in the form of an electrically conductive cylindrical cup having a front board serving as said cover board; and
said electret film is disposed on the surface of said diaphragm facing the back electrode board.

11. The microphone as set forth in claim 4 wherein said electret film is disposed on the surface of said back electrode board facing the diaphragm.

12. The microphone as set forth in claim 5 wherein said electret film is disposed on the surface of said back electrode board facing the diaphragm.

* * * * *

UNITED STATES PATENT AND TRADEMARK OFFICE
CERTIFICATE OF CORRECTION

PATENT NO. : 7,171,012 B2 Page 1 of 1
APPLICATION NO. : 10/725894
DATED : January 30, 2007
INVENTOR(S) : Toshiro Izuchi et al.

It is certified that error appears in the above-identified patent and that said Letters Patent is hereby corrected as shown below:

Column 15, line 4 of the patent "at on one end thereof" should be

-- "at one end thereof"--.

Signed and Sealed this

Tenth Day of July, 2007

JON W. DUDAS
*Director of the United States Patent and Trademark Office*